United States Patent [19]

Reincke

[11] Patent Number: 5,076,367
[45] Date of Patent: Dec. 31, 1991

[54] SOIL WORKING DEVICE

[75] Inventor: Marinus Reincke, Langbroek, Netherlands

[73] Assignee: Redexim B.V., Langbroek, Netherlands

[21] Appl. No.: 528,853

[22] Filed: May 25, 1990

[30] Foreign Application Priority Data

May 26, 1989 [NL] Netherlands .......................... 89 01333

[51] Int. Cl.$^5$ ............................................. A01B 33/04
[52] U.S. Cl. .......................................... 172/123; 15/82; 172/78; 56/DIG. 12
[58] Field of Search .................... 172/30, 35, 48, 78, 172/118-123; 56/DIG. 12; 15/78, 82

[56] References Cited

U.S. PATENT DOCUMENTS

| | | | |
|---|---|---|---|
| 599,937 | 3/1898 | Jones et al. | 15/82 |
| 2,644,386 | 7/1953 | Sutton | 172/60 X |
| 2,701,889 | 2/1955 | Riddell | 15/82 X |
| 4,373,590 | 2/1983 | Wittrock | 172/123 X |
| 4,412,587 | 11/1983 | van der Lely | 172/123 X |
| 4,520,873 | 6/1985 | Gefen | 172/123 X |
| 4,586,444 | 5/1986 | Thiessen | 172/60 X |

FOREIGN PATENT DOCUMENTS 116429 6/1918 United Kingdom .................... 15/82

Primary Examiner—Dennis L. Taylor
Assistant Examiner—Jeffrey L. Thompson
Attorney, Agent, or Firm—Bauer & Schaffer

[57] ABSTRACT

The invention relates to a soil working device, comprising a substantially cylindrical soil working member, which is mounted between two main supporting arms for rotation about a substantially horizontal axis and is axially composed of a number of sections which are mutually connected and connected with two shaft end sections journalled in said main supporting arms respectively through couplings of the universal type, the coupling between each two sections being supported by an auxiliary supporting arm which extends into the travelling direction and pivotally engages a connecting bar extending between said main supporting arms parallel to and in front of said soil working member. According to the invention both the axis of the soil working member and the connecting bar are located at substantially the same level, so that the auxiliary supporting arms are disposed in a substantially horizontal position and the rotational axis of the working member will be kept, as viewed in plan view during operation, substantially straight.

7 Claims, 3 Drawing Sheets

SOIL WORKING DEVICE

The invention relates to a soil working device, comprising a substantially cylindrical soil working member, which is mounted between two main supporting arms for rotation about a substantially horizontal axis and is axially composed of a number of sections which are mutually connected and connected with two shaft end sections journalled in said main supporting arms respectively through couplings of the universal type, the coupling between each two sections being supported by an auxiliary supporting arm which extends into the travelling direction and pivotally engages a connecting bar extending between said main supporting arms parallel to and in front of said soil working member. Such a soil working device is known from GB-A-116 469.

A soil working member, composed of a number of universally pivotably connected sections—which member in the well-known device is formed by a rotary brush or sweeping roll—has the advantage, that the soil working member can adpat itself to irregularities of the surface to be worked, which is to be seen as a condition for a uniform treatment.

A disadvantage of the well-known device is to be seen in that the suspension (through the auxiliary supporting arms) of the couplings between the sections is such, that these sections—while following the unevennesses in the ground to be worked—will also mutually pivot in the horizontal plane. As a result of this at least some of the sections of the soil working member will not properly track in the travelling direction of the device.

In accordance with the present invention this drawback is overcome due to the fact that both the axis of the soil working member and the connecting bar are located at substantially the same level, so that the auxiliary supporting arms are taking a substantially horizontal position and the rotational axis of the working member will be kept—as seen in the horizontal plane, substantially straight.

According to a further feature of the invention the auxiliary supporting arms are each formed by an upstanding plate member comprising a bearing for a cylindrical central portion of the respective universal coupling, said plate members being each connected to said connecting bar by means of a connecting lever and form carrying members for two series of supporting rollers of smaller diameter, which are located in front of and behind said soil working member respectively and are mutually movably coupled one to another. When so constructed the soil working member may be kept along its entire length with a constant small clearance just free from the surface to be worked. Such a construction is particularly suitable, when a rotary brush or sweeping roll is used as a soil working member. In that case the device is particularly suitable for treating undulating grounds, such as a golf course. To improve the drainage of a golf course often numerous holes are pierced into the soil. A device according to the invention, carried out as a sweeping device, may then be successfully used to fill up such holes with sand, by sweeping a sand layer, which has been spread onto the golf course in advance, into said holes by means of the flexible rotary brush.

In a preferred embodiment the couplings between the sections of the soil working member are formed by intermediary shaft sections, the ends of which are provided with thickenings, which have a non-circular cross-sectional shape and are axially slightly convex in shape, said thickenings engaging into correspondingly cross-sectionally shaped recesses in the opposing ends of adjacent sections; whereas also each shaft end portion is, at its inwardly directed end, provided with a thickening, which is shaped as indicated hereinbefore and which engages into a recess in the adjacent end face of the respective outer section.

The invention will be hereinafter further explained with reference to the drawing, in which by way of example a sweeping device, provided with a flexible rotary brush according to the invention, has been shown.

Figure 1:
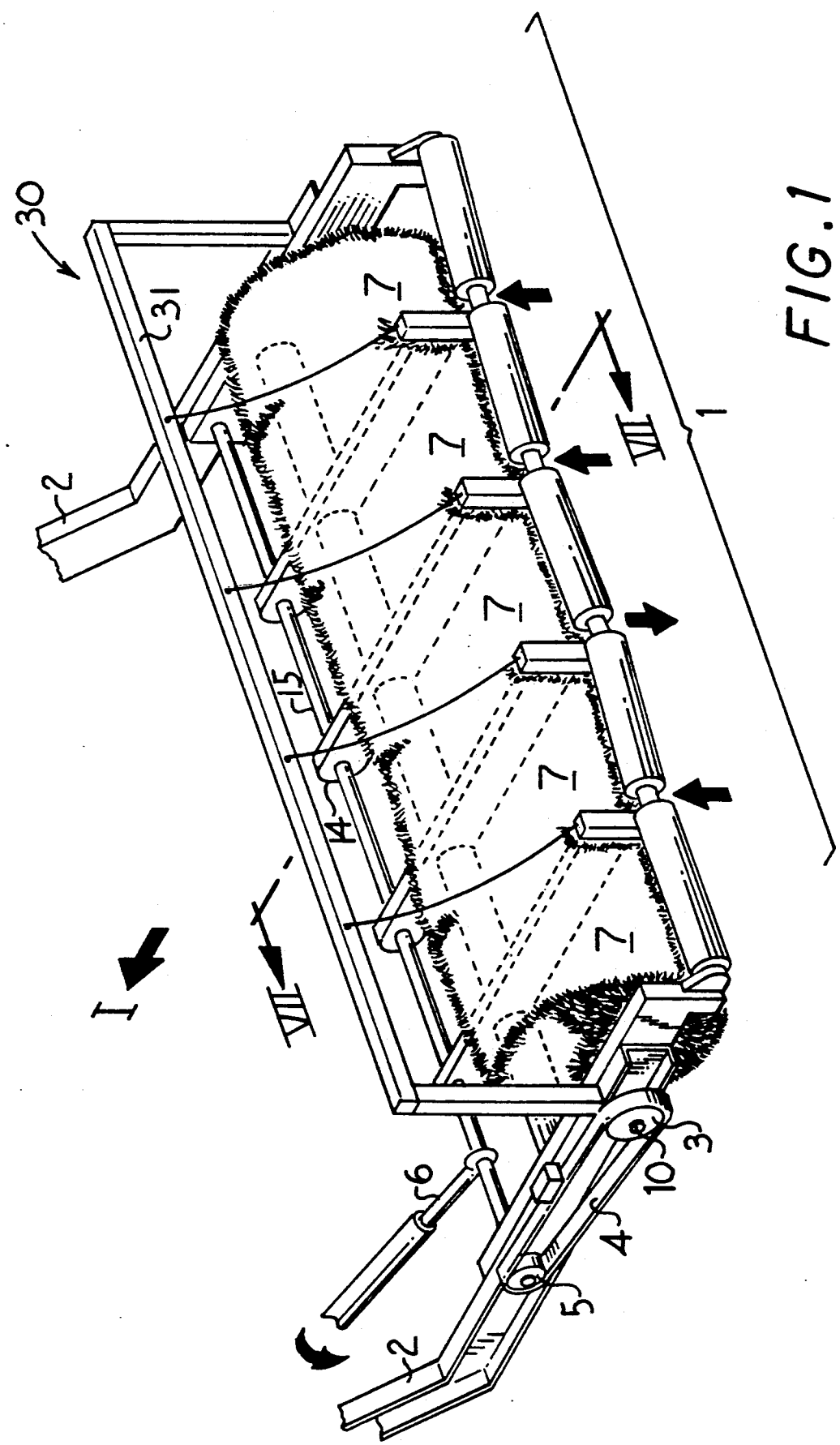
FIG. 1 is a perspective view of the device having a flexible rotary brush according to the invention.
Figure 2:
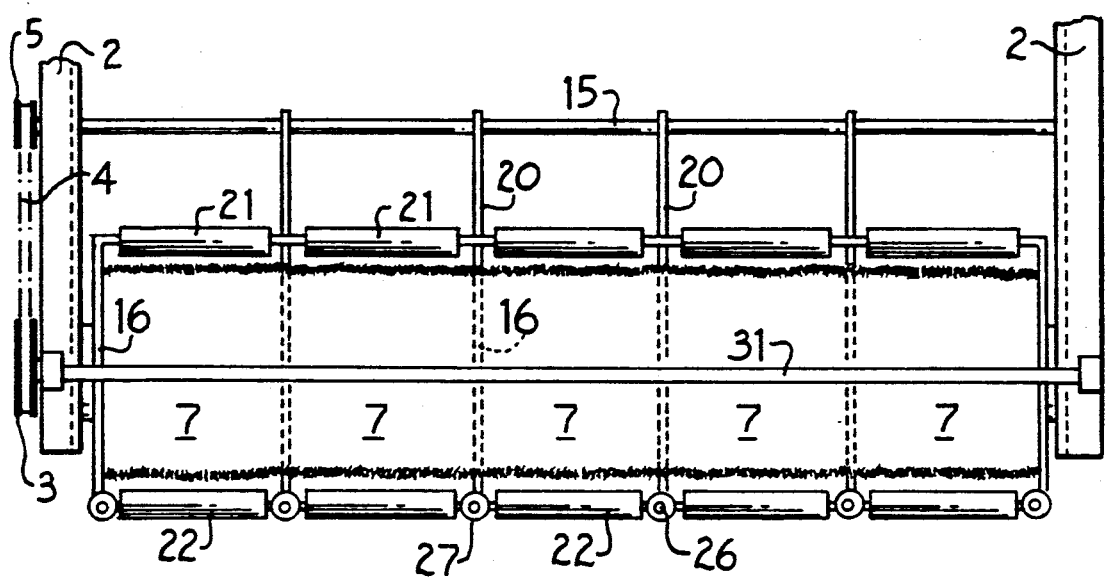
FIG. 2 is a plan view of the device of FIG. 1.

The device shown in the drawing comprises a rotary brush or sweeping roll 1, which is rotatably suspended between two supporting arms 2, which may be mounted, e.g. in a rearwardly or forwardly extending fashion, on a machine or vehicle, such as a tractor.

The brush 1 may be driven by means of a sprocket wheel 3, which is driven in turn, via a chain 4, by a sprocket wheel 5 which is coupled with a drive shaft 6, e.g. the stub axle of a tractor.

The rotary brush or sweeping roll 1 is composed of a number (five in the example shown) of sections 7. These sections each comprise a substantially cylindrical body 8, carrying the active elements, viz. the bristles 9.

The brush shaft consists of two shaft end portions 10 which are each journalled in the free end of a supporting arm 2, and a plurality (four in the example shown) of intermediary shaft sections 11, the latter forming in fact coupling members between the adjacent brush sections. The sprocket wheel 3 is fastened on one of the shaft end portions 10.

Figure 5:
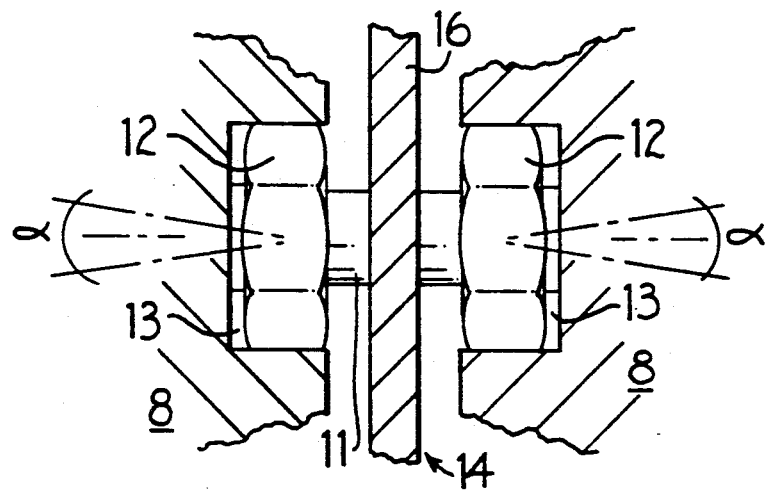
FIG. 5 is a detailed longitudinal section of a coupling between two rotary brush sections.

The intermediary shaft sections 11 have, at each end, a thickening 12 of a non-circular, e.g. hexagonal cross-sectional shape. These thickenings engage into correspondingly shaped, e.g. hexagonally formed recesses 13 in the opposite ends of two adjacent brush sections 7 (vide in particular FIG. 5). The (hexagonally-shaped) thickenings 12 are axially slightly convex in shape, due to which the brush sections 7 may pivot through a certain angle in universal directions relative to the respective thickenings 12. In addition the thickenings 12 may slide through a slight distance axially within the respective recesses 13.

In a similar manner the inwardly projecting ends of the shaft end portions 10 are provided with thickenings 12, which engage into correspondingly shaped recesses of the outer brush sections 7 (which are disposed immediately adjacent the supporting arms 2).

In FIG. 1 it is illustrated how a rotary brush 1 constructed in this way may adapt itself to unevennesses of the ground surface to be worked. At the upwardly directing arrows the brush sections are deviated upwardly to adapt to rises in the ground, whereas the downwardly pointing arrows indicate an adaptation of the brush sections to a lowering in the ground.

In the horizontal plane mutual pivotal displacements of the brush sections are in fact undesired. For this reason the rotary brush is supported in the horizontal direction at each intermediary shaft section 11 by means of a auxiliary arm 14 that extends into the travelling direction of the sweeping device and is pivotally connected to a bar 15 extending between the supporting arms 2 parallel to the shaft end portions 10.

Due to the auxiliary arms 14 the brush will, as seen from above, be kept substantially straight.

In the embodiment shown in the drawing the auxiliary arms 14 are each constituted by an upstanding plate member 16, provided with a bearing 17 for the cylindrical central portion 18 of the respective shaft end portion 10 or the respective intermediate shaft section 11. The plate members 16 are each connected to the bar 15 by means of a lever 20 to which it is pivotally connected at 19. (Vide in particular FIG. 7). The plate members 16 also serve as supports for two series of rollers 21 and 22 of smaller diameter which are positioned in front of and behind the brush shaft respectively. The rollers 21 and 22 have a length corresponding to that of the brush sections 7. The forward rollers 21 as well as the rearward rollers 22 are mounted for mutual displacement such that they are allowed to follow the unevennesses in the ground to be worked.

Figure 3:
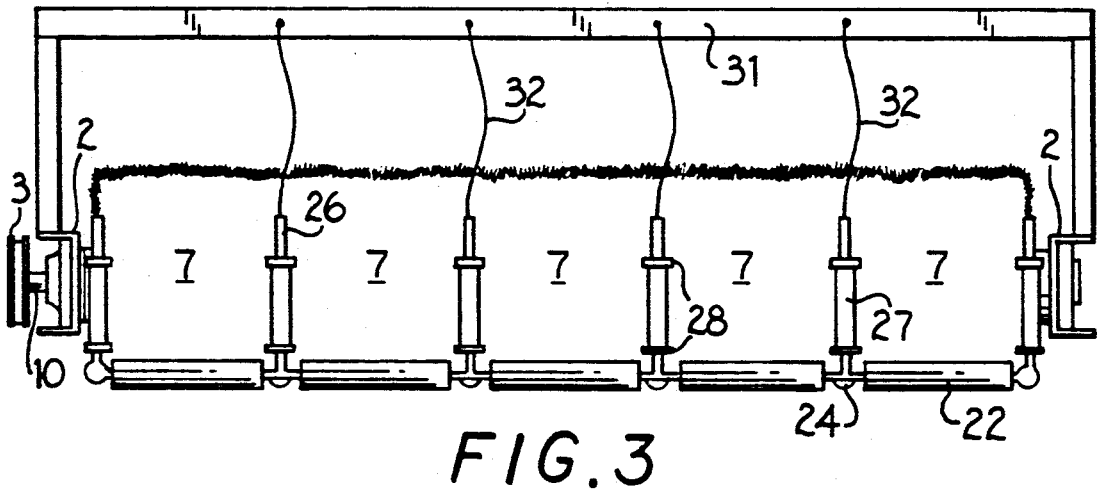
FIG. 3 is a rear view of the device of FIG. 1.
Figure 4:
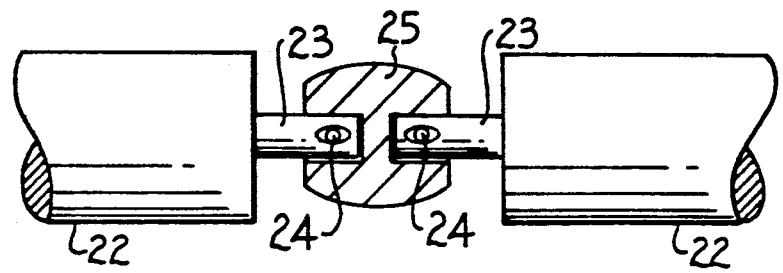
FIG. 4 shows a detail relating to the coupling between two supporting rollers.
Figure 7:
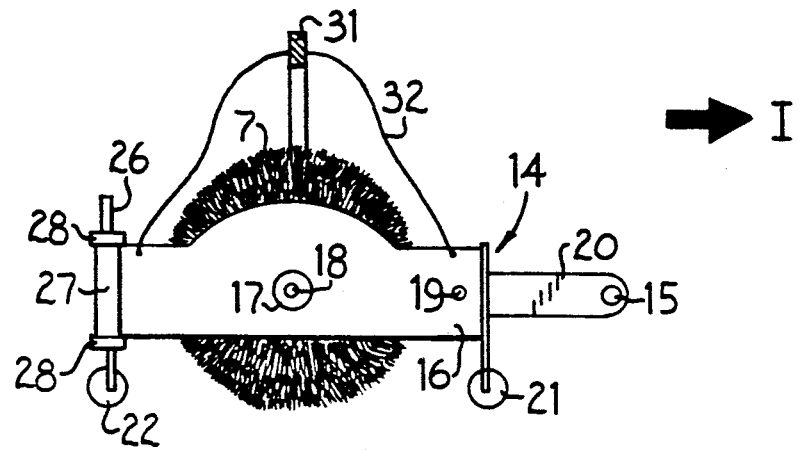
FIG. 7 is a cross-sectional view along the line VII—VII in FIG. 1.

Furthermore the rearward rollers 22 are vertically adjustably mounted relative to the plate members 16 (vide FIGS. 3, 4 and 7). For this purpose the opposing shaft ends 23 of each pair of adjacent rollers 22 are connected—by means of a rather flexible pin-slot connecting means 24—to the lower end 25 of a vertical threaded rod 26, which is accommodated in the bushing-shaped terminal edge 27 of the respective plate member 16. The position of the nuts 28 along the threaded rod 26 determines the height of the brush shaft 18 at the respective plate member 16.

The use of the series of rollers 21 and 22 enables the rotary brush 1 with the ends of the bristles to be kept—as seen in the longitudinal direction of the brush—to be kept at a rather constant clearance just free from the ground.

In this embodiment the device according to the present invention is particularly suitable for use on golf courses and more particularly for filling up to the vertical drainage holes made therein, by sand which has been previously spread as a layer onto the golf course.

Figure 6:
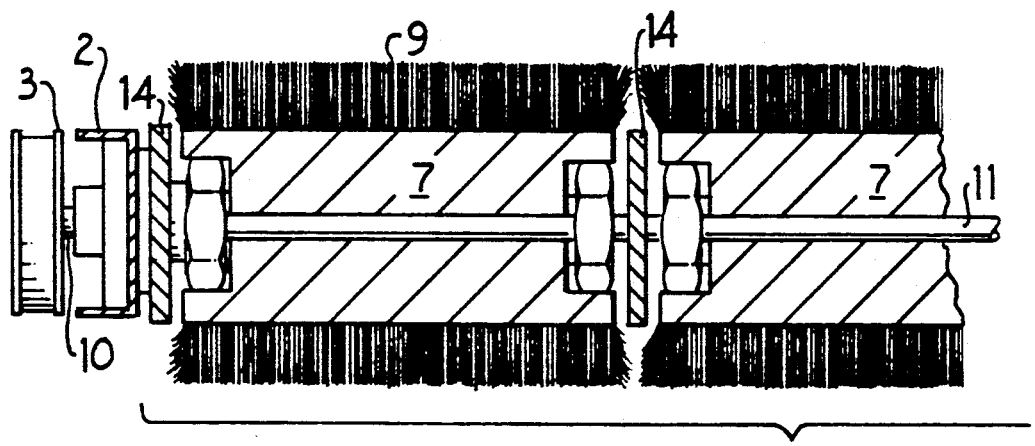
FIG. 6 shows an axial section through a part of the rolling brush, showing in particular how the bristles are implanted

When used in this way it is also important that there will be no forming of ridges of sand at the transitions between the brush sections. For this reason the bristles located adjacent the ends of the bodies 8 (vide in particular FIG. 6) are implanted to extend slightly obliquely outwardly, so that the bristles at the opposing ends of adjacent brush sections will slightly overlap each other. When the brush is rotating, these bristles will smoothly flex back each time they pass at those locations in front of and behind the brush, where the plate members 16 are projecting. For this purpose the upper and lower edges of the plate members 16 are bevelled or rounded off (vide FIG. 6).

A bridge member 30 is extending also between the two supporting arms 2, the horizontal, rod-shaped portion 31 of which is located vertically above the brush shaft. The plate members 16 are each connected with said rod 31 by means of flexible cords 32 so as to limit the deviation of the brush sections in the downward direction—e.g. when elevating the entire device by means of the supporting arms 2 from its operative position.

The supporting arms 2 may, at their ends (not shown) turned away from the brush, be pivotally connected, about a horizontal transverse axis, to the carrying vehicle or machine. Preferably the supporting arms may pivot independently of each other, so that the brush may adapt itself to variations of the transverse sloping of the ground to be worked, occurring in the travelling direction. For this purpose the bridge member 30 will have to be flexibly connected so as to allow mutual pivotal movements of the two supporting arms 2.

I claim:

1. A soil working device, comprising a substantially cylindrical soil working member, which is mounted between two main supporting arms for rotation about a substantially horizontal axis and is axially composed of a number of sections which are mutually coupled, two shaft end sections extending from said working member and journalled in said main supporting arms respectively through couplings of the universal type, the mutual coupling between each two sections being supported by an auxiliary supporting arm which extends into the travelling direction and pivotally engages a connecting bar extending between said main supporting arms parallel to and in front of said soil working member, characterized in that both the axis of the soil working member and the connecting bar are located at substantially the same level, so that the auxiliary arms are disposed in a substantially horizontal position and the rotational axis of the working member will remain substantially straight as viewed in plan view during operation, each of said auxiliary arms consists of an upstanding plate member having a bearing for supporting said mutual couplings between said sections, each said coupling comprising an intermediary shaft section having a cylindrical central portion and respective shaft end portion, said plate members being each connected to said connecting bar by means of a connecting lever and form carrying members for two series of supporting rollers of smaller diameter than said working member which are located in front of and behind the soil working member respectively and are mutually movably coupled one to another.

2. A device according to claim 1, characterized in that at least one of said series of rollers is vertically adjustably supported by said plate members.

3. A device according to claim 2, in which a rotary brush is used as a soil working member, characterized in that the bristles of the brush at the ends of the brush sections are implanted to extend slightly obliquely outwardly, so that the bristle ends, at the opposing ends of adjacent brush sections, will slightly overlap each other.

4. Soil working device according to claim 3, characterized in that the couplings between the sections are constituted by intermediary shaft sections, the ends of which are provided with thickenings, which have a non-circular cross-sectional shape and are axially slightly convex in shape, said thickenings engaging into correspondingly cross-sectionally shaped recesses in the opposing ends of adjacent sections.

5. A soil working device according to claim 4, characterized in that each shaft end portion is, at its inwardly directed end, also provided with a thickening, which is shaped as indicated in claim 4 and which are engaged into a recess in the adjacent end face of the respective outer section.

6. A soil working device according to claim 5, characterized in that the thickenings are slidable within said recesses.

7. A soil working device according to claim 5, characterized in that the deviation of the sections in the downward direction is limited in that the auxiliary arms or plate members thereof are suspended by means of flexible connecting means to a suspension bar extending between said supporting arms in a position above said soil working means.

* * * * *